(12) United States Patent  
Herbst

(10) Patent No.: US 6,548,006 B1  
(45) Date of Patent: Apr. 15, 2003

(54) PLASTIC MATERIAL INJECTION MOLDING MACHINE, A HANDLING SYSTEM AND A METHOD FOR TRANSFERRING AN ARTICLE

(75) Inventor: Richard Herbst, Eching (DE)

(73) Assignee: Hekuma Herbst Maschinenbau GmbH, Eching (DE)

( * ) Notice: Subject to any disclaimer, the term of this patent is extended or adjusted under 35 U.S.C. 154(b) by 207 days.

(21) Appl. No.: 09/687,474

(22) Filed: Oct. 13, 2000

(30) Foreign Application Priority Data

Oct. 15, 1999 (DE) .......................... 199 49 851

(51) Int. Cl.[7] .............................................. B29C 31/08
(52) U.S. Cl. ..................... 264/275; 425/126.1
(58) Field of Search .................. 425/126.1; 414/222.04, 414/222.06, 589; 264/275

(56) References Cited

U.S. PATENT DOCUMENTS

| | | | | |
|---|---|---|---|---|
| 3,711,230 A | * | 1/1973 | Magerle | .................. 425/126.1 |
| 5,200,202 A | * | 4/1993 | Ahn | ........................ 425/126.1 |
| 5,286,426 A | * | 2/1994 | Rano et al. | ................. 264/40.1 |
| 5,288,698 A | | 2/1994 | Banjo et al. | ............. 425/126.1 |
| 5,876,766 A | * | 3/1999 | Chou | ....................... 425/126.1 |

FOREIGN PATENT DOCUMENTS

| | | |
|---|---|---|
| DE | 41 02 934 A1 | 8/1991 |
| EP | 0 463 217 A1 | 1/1992 |
| EP | 0 893 221 A2 | 1/1999 |
| JP | 62070013 A * | 3/1987 ........... B29C/43/18 |

* cited by examiner

*Primary Examiner*—Robert Davis  
(74) *Attorney, Agent, or Firm*—Knobbe, Martens, Olson & Bear, LLP

(57) ABSTRACT

A plastic material injection molding machine comprises a mold having at least two mold portions and a handling system adapted to be inserted between the mold portions when the mold is in its open position, for transferring an article between the handling system and a predetermined mold portion. The handling system, moreover, comprises a transfer plate supported loosely therein. The handling system, further, is adapted to approach the predetermined mold portion such that prior to the transfer of the article a first reference means on the predetermined mold portion can be brought into a registering position with a second reference means on the transfer plate. A clutch is provided for bridging the loose support.

20 Claims, 3 Drawing Sheets

PLASTIC MATERIAL INJECTION MOLDING MACHINE, A HANDLING SYSTEM AND A METHOD FOR TRANSFERRING AN ARTICLE

FIELD OF THE INVENTION

The invention is related to the field of injection molding plastic material articles.

More specifically, the invention is related to a plastic material injection molding machine comprising a mold having at least two mold portions and a handling system adapted to be inserted between the mold portions when the mold is in its open position, for transferring an article between the handling system and a predetermined mold portion, the handling system, moreover, comprising a transfer plate supported loosely therein, the handling system, further, being adapted to approach the predetermined mold portion such that prior to the transfer of the article a first reference means on the predetermined mold portion can be brought into a registering position with a second reference means on the transfer plate.

The invention is, further, related to a handling system having means for transferring an article between a handling system and a predetermined position, the handling system comprising a transfer plate supported loosely therein and being adapted to approach the predetermined position such that prior to the transfer of the article a first reference means on the predetermined position can be brought into a registering position with a second reference means on the transfer plate.

The invention, moreover, is related to a method for transferring an article between a handling system and a predetermined mold portion of a plastic material injection molding machine having a mold with at least two mold portions, the handling system being adapted to be inserted between the mold portions when the mold is in its open position, the handling system, moreover, comprising a transfer plate supported loosely therein, the handling system, further, being adapted to approach the predetermined mold portion such that prior to the transfer of the article a first reference means on the predetermined mold portion can be brought into a registering position with a second reference means on the transfer plate.

Finally, the invention is related to a method for transferring an article between a handling system and a predetermined position, the handling system comprising a transfer plate supported loosely therein, the handling system, further, being adapted to approach the predetermined position such that prior to the transfer of the article a first reference means on the predetermined position can be brought into a registering position with a second reference means on the transfer plate.

BACKGROUND OF THE INVENTION

A plastic material injection molding machine, a handling system as well as methods of the types specified before are known in the art.

In connection with the plastic material injection molding machines, so-called handling systems are used which, when the mold is open, are inserted between the mold portions which are then at a distance from each other, for executing various objectives.

The most important objective of a handling system is to pick up the finished injection-molded plastic material articles from the hollow cavities of the mold after the opening of the mold, when the plastic material articles are ejected from the hollow cavities by means of ejector pins. For that purpose the handling systems are provided with an arm adapted to be inserted between the mold portions, the arm being equipped with corresponding receiving means. The receiving means may be configured mechanically, pneumatically or otherwise.

These configurations are basically independent of how the mold of the injection molding machine is configured in detail, i.e. whether the mold consists only of two mold portions or whether the mold is configured as a so-called stack mold comprising a center platen and laterally adjoining mold portions. For these various applications the handling system needs only to be configured correspondingly by multiplication or otherwise.

A further objectives of handling systems consists to insert certain parts into the hollow cavities of the mold prior to the beginning of the injection cycle. These parts or devices are subsequently immersed in liquid plastic material when the mold is closed so that the finished plastic material articles are provided with inserts embedded therein.

Such inserts may be so-called "labels" as are utilized as cover surfaces for smart cards or the like. Inserts, however, may also be electrical connector elements, i.e. contact pins or the like, as an example being embedded into a socket of an electrical component during the injection process. Moreover, such inserts may be reinforcing devices, hinges, mechanical fasteners or the like. Insofar, the invention is in now way restricted.

With all these objectives of handling systems a basic problem exists in that during the insertion of the handling system or of the handling system arm, respectively, between the mold portions a coordination in position between the handling system or the arm, respectively, on the one hand and that predetermined mold portion on the other hand must be established that shall be approached by the handling system. Considering that handling systems, in particular as used in connection with highly complex injection molding machines with corresponding external dimensions have correspondingly long cantilevered arms, it is not always possible to achieve a precise coordination of the movements even if precise position drives are utilized.

The afore-mentioned problems also arise outside of the mold when the handling system with its arm is displaced into a position outside the plastic material injection molding machine. At this external position, for example, those finished injection-molded plastic material articles that had been unloaded from the mold before, are transferred to further stations or, in the case of inserting parts, these inserts are picked up at those external positions for being subsequently transferred into the hollow cavities of the mold. In any event, it is necessary to approach that position outside of the mold exactly when it is in a station outside of the machine. However, even there is no such station outside of the machine, a precise positioning is also mandatory because a precise initial position for the arm of the handling system must be established in order to enable a precise displacement towards its end position between the mold portions.

The afore-discussed problems are also of importance for handling systems as used in general applications, i.e. as are used outside the field of plastic material injection molding machines. The invention is, hence, not limited to this particular application but is related to all conceivable applications of handling systems irrespective of the particular technical field.

It is known in the art to provide the predetermined mold portion on the one hand and its opposed side of the handling system on the other hand with a reference means or mark which have to be brought into engagement with one another in order to ensure that during the transfer of the article an exact relative positioning between the handling system and the mold portion prevails. This, too, is independent of whether the term "transfer of the article" is to be understood to mean the un-loading of a finished injection-molded plastic material article or the deposition of an insert or the like.

In the simplest case the reference means on the mold portion on the one hand and on the handling system on the other hand are complementary mechanical elements, for example a bore and a pin. Preferably, the bore is provided with a canted or beveled insertion surface and the pin is pointed at its front tip. When the handling system is inserted between the mold portions in a radial direction (relative to the axis of the injection molding machine) and then approaches the predetermined mold portion in an axial direction and, further, when the reference means are not exactly flush with one another, the afore-mentioned canted or beveled insertion surface of the bore or the also above-mentioned pointing of the pin effects that the pin will be inserted into the bore even if there is a certain offset between the two.

However, one will easily appreciate that such a correction movement within a radial plane will effect a mechanical constraint within the handling system because the handling system is forced to move out of the nominal position that it had just attained.

It is, therefore, also known in the art to provide a separate transfer plate for the transfer of the article within the handling system or within the inserted arm of the handling system and to support the transfer plate loosely, for example elastically movable within that radial plane, in the handling system or its arm.

Accordingly, during a correction movement out of the attained nominal position in the meaning of what was discussed above, only the transfer plate is slightly shifted within the range of movement of its movable support whereas no mechanical constraint is exerted on the handling system.

However, this prior art handling system has the disadvantage that the movable support of the transfer plate within the handling system causes problems during a fast displacement of the handling system, in particular when the handling system is strongly accelerated or strongly decelerated. The movably supported transfer plate with its movable support will hit against its mechanical stop in these cases, wherein this will happen several times during a handling process, namely during each acceleration and each deceleration. One has to bear in mind insofar that in the interest of a minimum cycle time of the plastic material injection molding machine, it is desired to move the handling system as quickly as possible, i.e. with the highest possible accelerations and decelerations.

The uncontrolled oscillatory movement of the transfer plate within the handling system will not become apparent only acoustically but will result in a significant wear of the elastic support and, hence, in its breakdown within a very short period of time. This, again, results in downtimes of the plastic material injection molding machine so that the resulting productivity of the plastic material injection molding machine may get lost entirely or partially in spite of minimum cycle times.

It is, therefore, an object underlying the invention to provide a plastic material injection molding machine as well as a method of the kind specified at the outset such that the above-discussed disadvantages are avoided.

In particular, it shall become possible to make a correction in position also in a wrong positioning of the transfer plate when it has attained its nominal position without substantial mechanical reactions on the handling system. Moreover, this shall become possible without the need of limiting the velocity of displacement, in particular the accelerations and the decelerations of the handling system.

SUMMARY OF THE INVENTION

In a plastic material injection molding machine of the type specified at the outset, this object is achieved according to the invention in that a clutch is provided for bridging the loose support.

In a handling system specified at the outset, the object is achieved according to the invention in that a clutch is provided for bridging the loose support.

According to the first method mentioned at the outset, the object is achieved according to the invention in that the loose support is bridged by means of a clutch at least during the insertion of the handling system between the mold portions.

Finally, according to the second method specified at the out-set, the object is achieved according to the invention in that the loose support is bridged by means of a clutch at least before the approachment to the predetermined position.

The object underlying the invention is thus entirely solved.

If the movable support of the transfer plate is blocked at any time when it is not needed during the bringing into engagement of the reference means, one has no limiting side conditions with respect to the velocity, acceleration or deceleration of displacement. Instead, the handling system may be displaced with the maximum velocity, acceleration and deceleration as is possible for the particular design of the handling system with-out any influence on the mechanical stability of the transfer plate which is mechanically locked to the handling system during these movements because the clutch is closed.

The invention, therefore, has significant advantages in particular when large transfer plates are required as is the case for multiple tools having a very large number of hollow cavities for the simultaneous manufacture of a plurality of typically small plastic material articles. Such large transfer plates have correspondingly large masses. Also in such applications the invention allows to operate with very quick movements.

In a preferred embodiment of the invention, the movable support is configured by an elastic support.

This measure has the advantage that the movable transfer plate after having effected an elastic movement, will automatically return essentially into the same initial position so that no large corrections in movement are necessary, however, it is also possible to configure the support plastically or braked or otherwise.

In a preferred embodiment of the inventive injection molding machine, the transfer plate is supported in an arm of the handling system.

This measure, known per se, has the advantage that only a narrow arm has to be inserted between the mold portions so that the mold portions need only to be opened by a relatively small amount. However, according to the invention it is also possible to configure the transfer plate as the arm of the handling system as a whole, i.e. to support the entire arm movably within the handling system, for example elastically or otherwise.

In another preferred embodiment of the inventive machine, the predetermined mold portion has an open surface when the mold is in its open position, the transfer plate being supported to move elastically within the plane defined by the open surface.

This measure has the advantage that the transfer plate is not only supported elastically along an axis but along a plane instead defined by two axes, and may correspondingly be latched by means of the clutch so that also complex motional sequences may be effected while entering or leaving a particular position.

In another embodiment of the inventive machine and the inventive method the clutch is adapted to be opened overlapping in time with the bringing into a registering position of the reference means and to be closed overlapping in time with the bringing out of a registering position of the reference means.

This measure has the advantage that the mechanical latching or locking of the transfer plate may be transferred automatically from the handling system or its arm to the predetermined mold portion so that the transfer of the article between the mold portion and the transfer plate may be effected while these elements are precisely aligned relative to one another. This enhances, for example, the precision of embedded contact elements of electrical components being an essential quality feature of such components.

Moreover, these measures have the advantage that the elastic support of the transfer plate is set free effectively for the absolute minimum in time, i.e. the transfer step for the article between the predetermined mold portion and the transfer plate, while otherwise the transfer plate is mechanically latched on the handling system or its arm at any time.

Correspondingly, for another variation of the inventive machine and the inventive method, respectively, the clutch is adapted to be opened automatically when the handling system approaches the predetermined mold portion.

This measure has the further essential advantage that a separate control for the clutch is not necessary at all because the corresponding clutch elements are actuated by the approaching movement itself so that the opening process and the subsequent closing process of the clutch is effected in an optimum way without the necessity of a complicated control.

In a mechanical embodiment of this variation, the clutch is adapted to be actuated by means of a rod being axially dis-placeable relative to the transfer plate in the direction of approachment of the handling system towards the predetermined mold portion, the rod protruding from a surface of the transfer plate opposite the predetermined mold portion.

This measure has the advantage that the clutch is actuated in a very simple manner by actuating the corresponding elements during the approachment of the handling system by making mechanical contact.

According to an improvement of this embodiment, the rod has a front side being flush with the second reference means as viewed in the direction of approachment.

This measure has the advantage specified above that the bringing into engagement of the reference means on the one hand and the actuation of the clutch on the other hand are effected synchronously as is also the case for the corresponding opening process.

In this respect it is preferred when the rod is journalled within the arm to be displaced in a longitudinal direction, that the clutch is configured by a section of the rod and by a seat surface in the transfer plate associated to the rod section, the clutch immobilizing the rod section on the seat surface in a plane transversal to the direction of approachment when the rod is in a first operational axial position and letting the rod section move freely when the rod is in a second operational axial position.

This measure has the advantage that the clutch is configured mechanically in an extremely simple manner in that only a rod is shifted to and fro in an axial direction between two operational positions.

This holds true in particular if, according to another improvement of this variation, the rod section and the seat surface are configured as complementary cones.

This measure has the advantage that when the cones adjoin each other, a reliable mechanical lock is guaranteed within the plane whereas on the other hand when the cones are axially off-set from one another, a sufficient clearance is guaranteed along the two axes defining the plane.

In this regard it is further preferred when the rod is held in the first operational axial position under the action of a spring, the spring being compressed during the transition from the first to the second operational axial position.

This measure has the advantage that during the entire movement of the handling system into and out of the gap between the mold portions, the spring holds the clutch in its closed state so that the transfer plate is mechanically latched to the handling system or its arm, respectively. Only during the short period of time of transfer to the predetermined mold portion, the spring is compressed and the clutch is thereby opened, which, again, activates the elastic support of the transfer plate.

Moreover, the machine according to the invention is preferred when the transfer plate is fixed to the handling system in the direction of approachment of the handling system towards the predetermined mold portion.

This measure has the advantage that clutches of simple design may be operated by axially displacing the handling system, as well already explained in connection with the above-mentioned embodiments. A relative movement between the transfer plate and the handling system must be only be guaranteed within the plane.

In this connection, a design is preferred according to which the transfer plate is surrounded by a flange of the handling system in the direction of approachment.

This measure has the advantage that the afore-mentioned axial fixation may be achieved in a particular simple manner.

According to embodiments of the inventive machine, reference means are preferred which, when brought into the registering position, come to engage one another in a form-fitting relationship. This may be effected, as known per se, in that the reference means are configured as a bore, in particular a blind bore, and as a pin, respectively, as is known in the art and as has already been discussed above.

As already mentioned, the invention is not restricted to the application in plastic material injection molding machines. All of the afore-mentioned examples and advantages hold likewise true for general applications of handling systems as well as for the indicated methods for transferring an article.

Further advantages will become apparent from the description and the enclosed drawing.

It goes without saying that the afore-mentioned features and those that will be explained here and after may not only be used in the particularly given combination, but also in other combinations or alone without leaving the scope of the present invention.

BRIEF DESCRIPTION OF THE DRAWINGS

Embodiments of the invention are shown in the drawing and will be explained in the subsequent description.

DETAILED DESCRIPTION OF THE PREFERRED EMBODIMENTS

Figure 1:
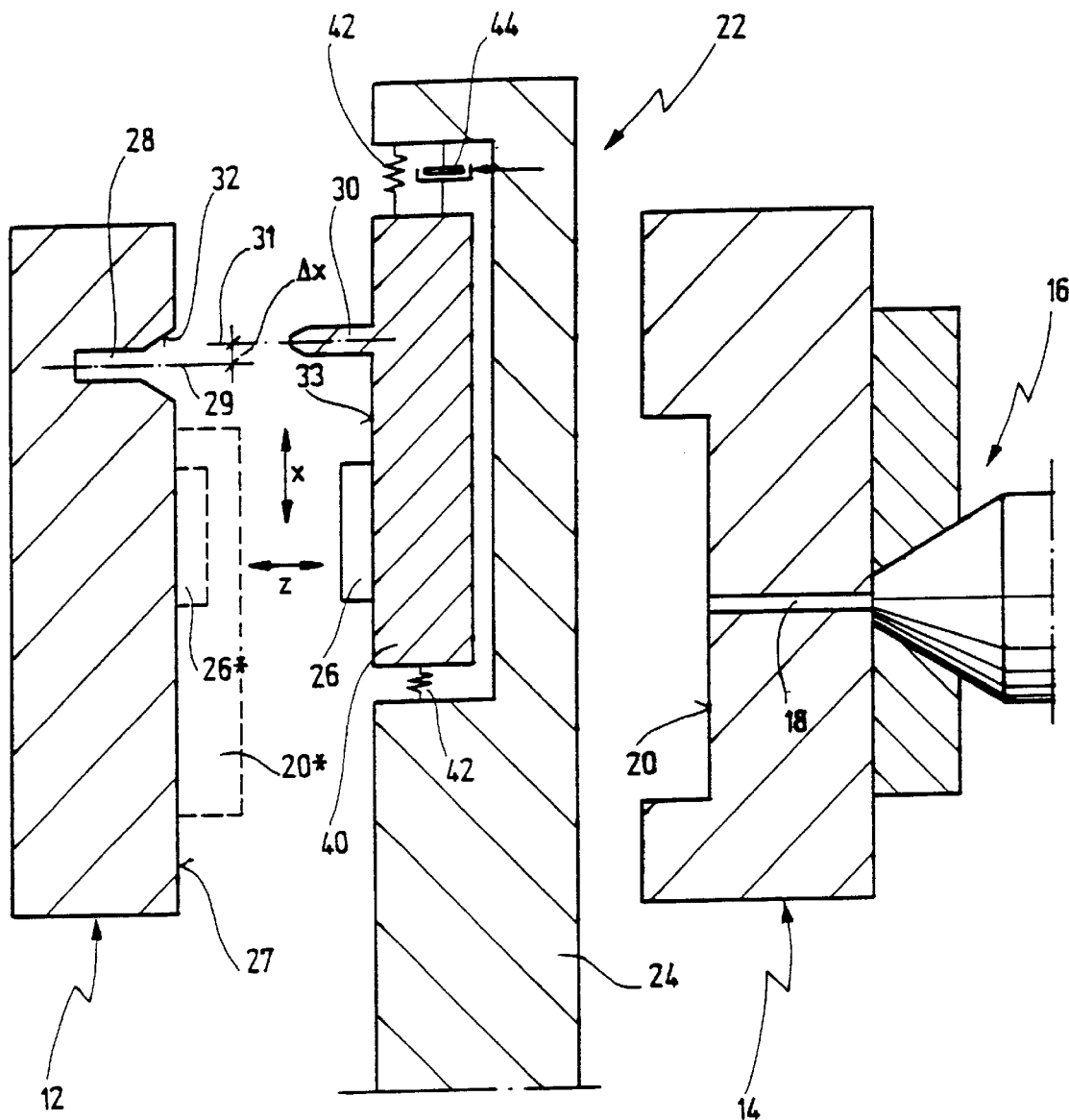
FIG. 1 shows a schematic side elevational cross-sectional view of an embodiment of a plastic material injection molding machine according to the present invention, having its mold in the open position and a handling system inserted therein.

In FIG. 1, reference numeral 10 as a whole indicates a plastic material injection molding machine of conventional design.

Plastic material injection molding machine 10 has a first mold portion 12 as well as a second mold portion 14. Mold portions 12 and 14 are at a distance from each other in the depiction of FIG. 1 so that the mold is in its open position.

Second mold portion 14 in the embodiment shown is a stationary mold portion. In FIG. 1, a conventional extruder 16 is connected thereto from the right hand side. Liquid plastic material is fed to a hollow cavity 20 via a channel 18. In the embodiment shown, hollow cavity 20 is only configured within second mold portion 14. On first mold portion 12, dashed lines and reference numeral 20* indicated where hollow cavity 20 is located when the mold is closed.

In FIG. 1, a handling system indicated at 22 is inserted between mold portions 12 and 14. Handling system 22 at its front end is configured as an arm 24. By means of arm 24, an insert 26 may be transferred from arm 24 to first mold portion 12, by placing insert 26 on a surface 27 facing arm 24.

In FIG. 1, the necessary axial movement of arm 24 is designated with a double arrow z symbolizing the direction of approachment and the direction of moving away arm 24 relative to first mold portion 12. A radial plane extending under right angles thereto is indicated by a double arrow x. Radial plane x is the plane along which arm 24 is inserted between mold portions 12 and 14 or retracted therefrom, respectively.

It should again be mentioned at this instance that within the scope of the present description of embodiments, the application with plastic material injection molding machines is solely to be understood as an example. The invention may be utilized beyond that application also in other fields. Insofar, the handling system with its arm must not necessarily be approached to a mold portion but, speaking in more general terms, may also be approached to a predetermined position.

Moreover, it should also be emphasized that the movements of approachment also in the case of application with a plastic material injection molding machine are not limited to a movement of the arm of the handling system into the gap between the opened mold portions into the area of the hollow cavities.

The same problems namely arise also when the handling system is retracted from the mold and assumes a predetermined final position outside the injection molding machine. Further stations may be located there to which the finished plastic material articles shall be transferred or from which inserts for a subsequent injection molding process shall be picked up. In any event, a precise initial position outside the injection molding machine helps to make the entering movement reproducible.

In FIG. 1, dashed lines on surface 27 of first mold portion 12 likewise indicate where insert 26* comes to lie within hollow cavity 20* in the closed state of the mold.

It should be briefly mentioned at this instance that the case of application of inserting an insert 26 described here shall also be understood only as an example because the invention as a whole may be utilized advantageously when it is only intended to unload finished injection-molded plastic material articles from the hollow cavity.

Moreover, it should be mentioned that the term "insert" shall be understood to mean any part or device as already mentioned above. Insert 26 may, for example, be a set of contact elements for an electrical plug connector or something else.

As will be easily appreciated, it is essential for the quality of the plastic material article injection-molded within hollow cavity 20* that insert 26* is positioned at a predetermined location within the finished plastic material article. For that reason it is mandatory to make sure that insert 26 is placed onto surface 27 at a precisely determined nominal position.

For that purpose, a simple mechanical control is provided because for technical reasons and due to the fact that the design of the handling system may for practical reasons not be too complicated, it is hardly possible to make the trajectory control of arm 24 so precise that through an external control the required precision in position with respect to insert 26 may be guaranteed.

The simple mechanical control consists of an assembly comprising a first reference means within surface 27, being, for example, configured as a blind bore 28, the axis of which is designated at 29. Arm 24 carries a pin 30 being designed complimentary to blind bore 28 and utilized as a second reference means. The axis of pin 30 is designated at 31.

In order to simplify a positive engagement of blind bore 28 and pin 30 in a situation where axis 29 and 31 are not flush one with another, as indicated by $\Delta x$ in FIG. 1, blind bore 28 is provided with a canted or beveled insertion surface 32 and pin 30 may likewise be pointed or beveled at its front end.

Arm 24 is now approached to first mold portion 12 in the z-direction. Simultaneously, pin 30 is inserted into blind bore 28, wherein, however, arm 24 would have to be shifted by offset $\Delta x$ in the x-direction which would impose a mechanical constraint on arm 24.

For that reason, that area of a surface 33 of arm 24, from which pin 30 protrudes with a front side 34, is configured as a movably or loosely supported transfer plate 40. This is symbolized in FIG. 1 by the fact that, for example, springs 42 as an elastic support or bearing are provided between transfer plate 40 and surrounding arm 24. Springs 42 support transfer plate 40 movably or loosely within the entire radial plane x, i.e. also in a vertical direction relative to the plane of FIG. 1. The term "elastic" shall be understood only as an example in this context. Also other types of support or bearing may be provided, for example a plastic support, a frictional or braked support or a support having no influence at all on the sequence of motions.

Further, it shall be stressed that movable transfer plate 40, too, shall only be understood as an example. Instead of utilizing a relatively small transfer plate, it would be within the scope of the present invention to support the entire arm of the handling system in the afore-mentioned manner. The invention, insofar, is not restricted.

Due to its loose support, transfer plate 40 may be shifted by offset $\Delta x$ within the x-plane without imposing a mechanical constraint or stress onto arm 24.

On the other hand side, the loose support of the transfer plate 40 within arm 24 has the disadvantage that transfer plate 40 within certain limits is loose within arm 24 also in dynamic situations so that when dynamic loads are exerted on the system, transfer plate 40 may move within the limits of springs 42. In practice, this means that transfer 40 will hit against surrounding arm 24 within its loose support during each acceleration or deceleration step, resulting in damages on the loose support over a longer period of time. Due to that, transfer plate 40 will rattle within arm 24 when the latter is repeatedly displaced within a corresponding acceleration or deceleration when entering into the mold or being retracted therefrom. Insofar, one has to bear in mind that the movements of handling system 22 shall be made as quick as possible in order to make the cycle time of the plastic material injection molding machine 10 as short as possible.

According to the invention, a switchable clutch 44 is, therefore, provided between transfer plate 40 and arm 24. Clutch 44 is held closed except a short period of time so that springs 42 and likewise the loose support of transfer plate 40 are bridged. When clutch 44 is closed, transfer plate 40 is, hence, rigidly connected to arm 24 and may be displaced together with the latter without any limits.

Only when pin 30 approached blind bore 28 and a compensation shall be effected with respect to a potential position offset Δx, clutch 44 is briefly opened so that transfer plate 40 for being transferred is itself put into the state of loose support for a short period of time. However, as soon as the transfer process is terminated and arm 24 may again be retracted from first mold portion 12, clutch 44 is again closed so that transfer plate 40 is again rigidly connected to arm 24.

By doing so, it becomes possible that arm 24 or the entire handling system 22, respectively, may be displaced with the maximum possible velocity, acceleration and deceleration, however, no mechanical constraints on arm 24 may occur due to position errors Δx.

It had already been mentioned that the problems of position errors may also occur outside the mold when the handling system with its arm approaches an external final position.

Figure 2:
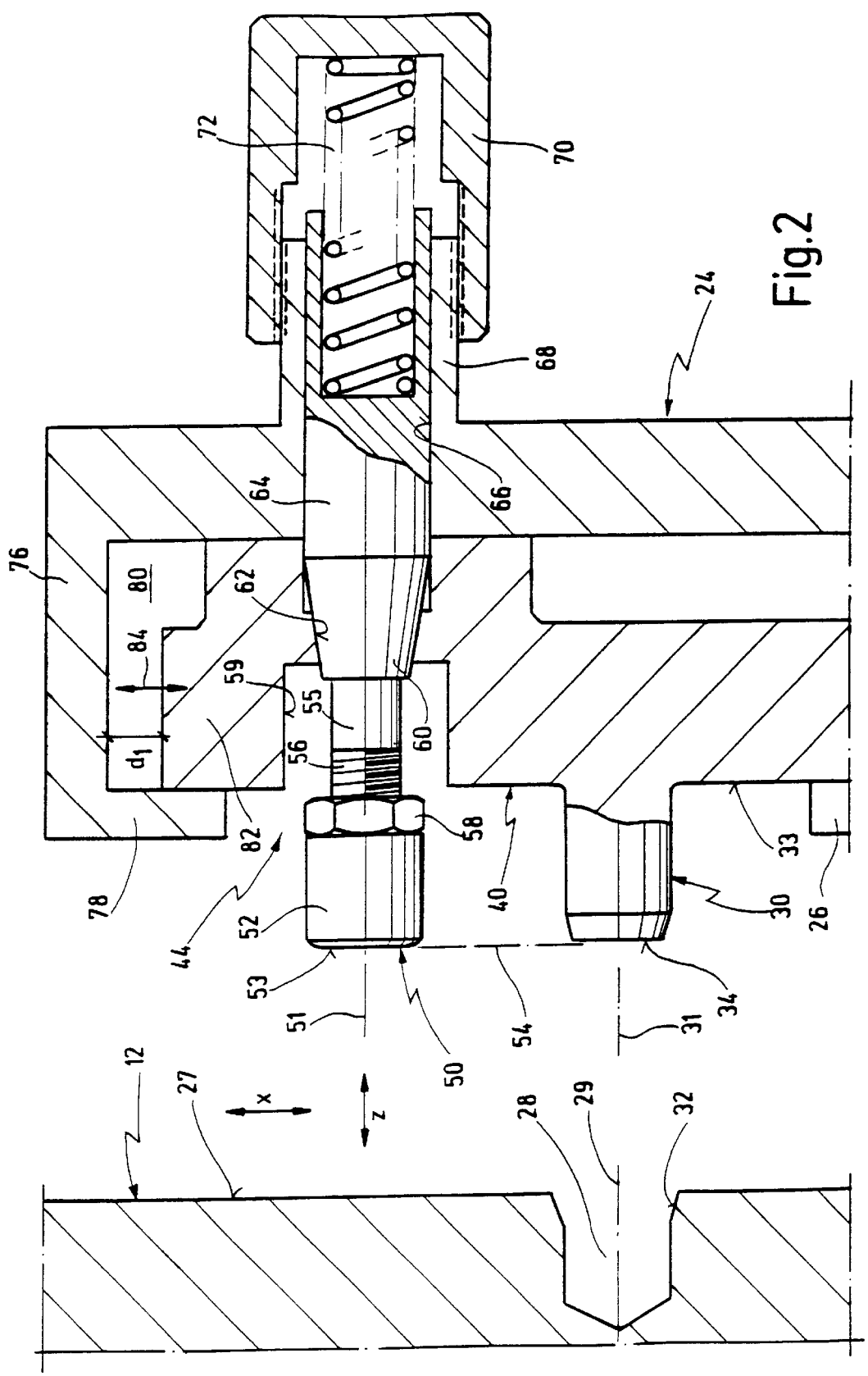
FIGS. 2 and 3 show a detail of a portion of FIG. 1 for further embodiments of the invention, in two different operational positions.
Figure 3:
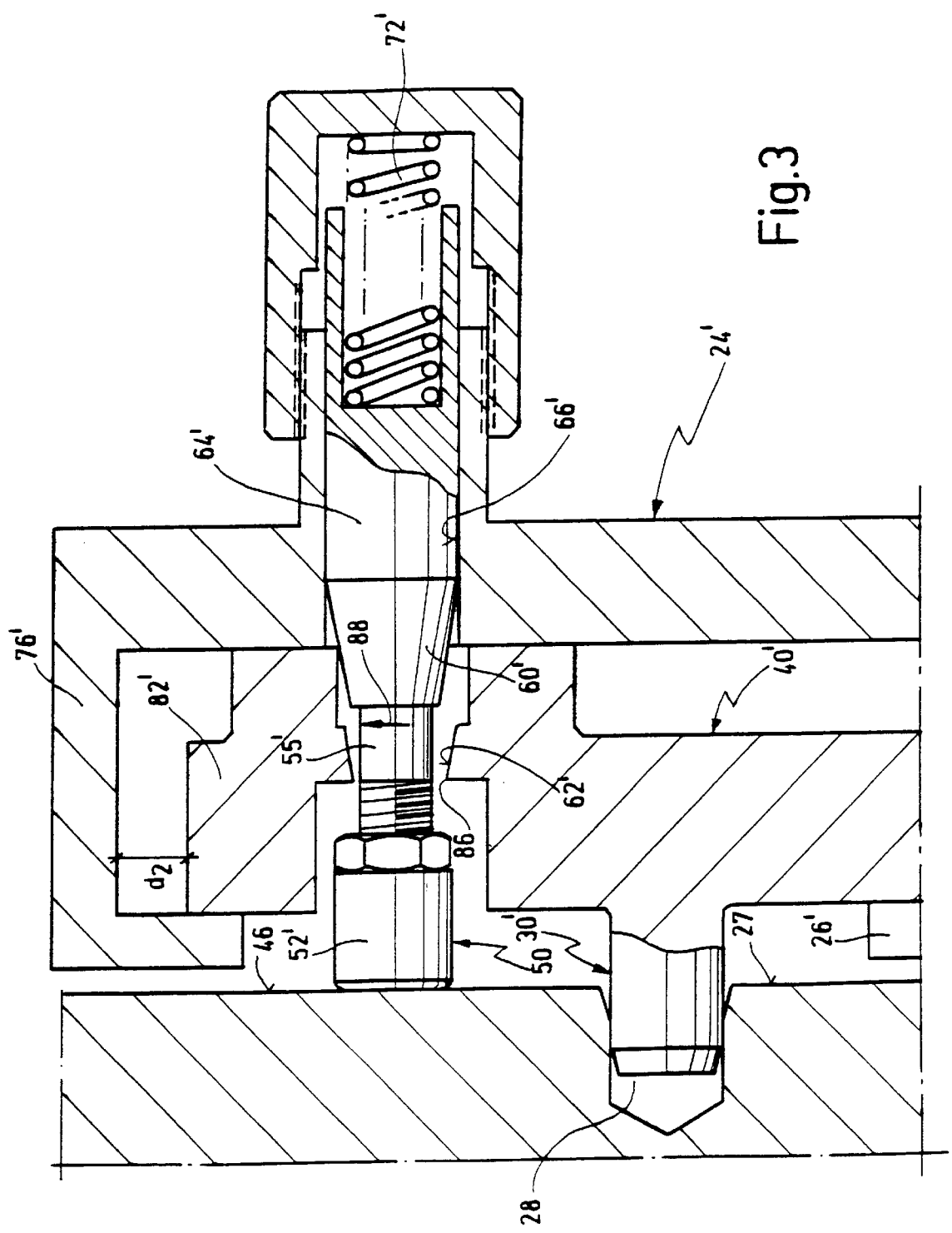

FIGS. 2 and 3 show further details of embodiments of clutch 44.

FIG. 2 shows a state where arm 24 is still distant from first mold portion 12 and clutch 24, therefore, is still closed.

As one may take from FIG. 2, clutch 44 essentially consists of an axially displaceable rod 50 having a longitudinal axis 51. In FIG. 2, a head 52 of rod 50 extends to the left hand side and protrudes over surface 33 of transfer plate 40. The front side of head 52 is designated at 53. A dash-dot line 54 further indicates that front side 53 of head 52 in that operational position is essentially flush with front side 34 of pin 30, when viewed in the x-plane.

In FIG. 2, there is a thinner cylindrical section 55 at the right hand side of head 52 which, in the area of head 52 is provided with a thread. By doing so, head 52 may be moved in an axial direction for adjustment purposes. A nut 58 is provided for a fixing of head 54 on rod 50 in its adjusted position.

In the area of head 52, transfer plate 40 is provided with a receiving recess 59 into which head 52 may be pushed back as will be explained further below.

On the right hand side of thin cylindrical section 55 in FIG. 2, there is a conical section 60 tapering down towards head 52. Conical section 60 in the operational position of FIG. 2 is seated against a complementary conical seat surface 62 of transfer plate 60.

On the right hand side of conical section 60, there is a cylindrical section 64 of rod 50 running in a cylindrical guide surface 66 of arm 24. Seen as a whole, rod 50, therefore, may be displaced along its axis 51 relative to transfer plate 40 and relative to arm 24.

Arm 24 in the area of cylindrical guide surface 66 is configured as a sleeve-type extension 68 being open to the right hand side. A threaded cap 70 is screwed onto sleeve-type extension 68. Threaded cap 70 may be rotated on extension 68 for adjustment purposes and is thereby displaced axially. A helical spring 72 is located between threaded cap 70 and cylindrical section 64 which, by appropriate rotation of threaded cap 70, may be biased in different ways.

In FIG. 2, a flange 76 extending axially may be seen at the upper end of arm 24. Flange 76 at its front end terminates in a protrusion 78. Protrusion 78 surrounds transfer plate 40 so that a form-fitting receiving recess 80 for transfer plate 40 is configured in the terminal portion of arm 24. An upper free end 82 of transfer plate is, hence, axially (z) fixed, however, may be displaced within the x-plane.

FIG. 2 clearly shows that transfer plate 40 in the position shown in FIG. 2 is also fixed within the x-plane. This is because conical section 60 is tightly seated against complementary conical section 62 and, hence, free end 82 of transfer plate 40 cannot move along a direction indicated with an arrow 84 because transfer plate 40, as mentioned before, is coupled with rod 40 in the x-plane whereby transfer plate 40 is immobilized within the x-plane because rod 50 is seated within cylindrical guide surface 66 of arm 24. In that position, clutch 44 is, therefore, closed and the radial distance of free end 82 from flange 76 is $d_1$.

Whereas FIG. 2, as mentioned before, shows the open position already shown in FIG. 1 where arm 24 with transfer plate 24 is still at a distance from mold portion 12, FIG. 3 shows the approached state. In FIG. 2, like elements are designated with like numerals. Elements that have been displaced are identified by an added apostrophe.

As one may easily appreciate by comparing FIGS. 2 and 3, due to the flush positioning 54, head 52 of rod 50 comes to lie on surface 27 of first mold portion 12 when front side 34 of pin 30 enters into canted insertion surface 32 of blind bore 28.

This means that clutch 44 is activated at the moment in time when the two reference means, i.e. blind bore 28 and pin 30 engage one another. It has already been mentioned that by turning head 52, a certain axial adjustment my be provided insofar.

As soon as head 52 comes to lie on surface 27 and arm 24 continues its movement to the left hand side, rod 50 is shifted relative to transfer plate 40 and also relative to arm 24 to the right hand side against the action of spring 72. As soon as that is the case, conical section 60 is lifted off complementary conical seat surface 62. The fixation of transfer plate 40 to arm 24 in the x-plane is, thus, removed which had been active in the position of FIG. 2.

In the position shown in FIG. 3, clutch 44 is, therefore, opened because the thinner cylindrical section 55' may be displaced within certain limits in the x-plane, namely within an opening 86 of complementary conical seat surface 62 that is now lying free. For example, in the embodiment shown in FIG. 3, transfer plate 40' was moved slightly downward relative to arm 24' so that now the distance between free end 82' from flange 76' is $d_2$, i.e. slightly larger as compared to distance $d_1$ in FIG. 2. This has happened because pin 30' had assumed an error position offset upwardly relative to blind bore 28 (cf. Δx in FIG. 1) with the consequence that transfer plate 40' had to be slightly moved downwardly until pin 30' could enter into blind bore 21.

In that position, a transfer of insert 26' onto surface 27 at a precise position is guaranteed.

If now arm 24' is again moved to the right hand side from the position shown in FIG. 3 and pin 30' slights out of blind bore 28, conical surface 60' will again be shifted onto complementary conical seat surface 62' with the consequence that the initial position of FIG. 2 is again assumed and transfer plate 40 is again latched to arm 24 in the x-plane.

What is claimed is:

1. A plastic material injection molding machine comprising:
 a) a mold having at least a first and a second mold portion, said first mold portion being provided with a first reference means;
 b) a handling system adapted to be inserted between said first and said second mold portion when said mold is in an open position, for transferring an article between said handling system and said first mold portion;
 c) a transfer plate held in said handling system via a loose support and being provided with a second reference means;
 d) means for approaching said handling system towards said first mold portion along a direction of approachment, such that prior to said transfer of said article between said handling system and said first mold portion said first reference means can be brought into a registering position with said second reference means; and
 e) a clutch for bridging said loose support.

2. The plastic material injection molding machine of claim 1, wherein said transfer plate is supported within said handling system via elastic elements, said elastic elements being adapted to be bridged by said clutch.

3. The plastic material injection molding machine of claim 1, wherein said transfer plate is supported in an arm of said handling system.

4. The plastic material injection molding machine of claim 1, wherein said first mold portion has an open surface when said mold is in said open position, said transfer plate being supported to move within a plane defined by said open surface.

5. The plastic material injection molding machine of claim 1, wherein said clutch is adapted to be opened in a manner overlapping in time with said bringing said reference means into said registering position.

6. The plastic material injection molding machine of claim 1, wherein said clutch is adapted to be closed in a manner overlapping in time with bringing said reference means out of said registering position.

7. The plastic material injection molding machine of claim 1, wherein said clutch is adapted to be opened automatically when said handling system approaches said first mold portion.

8. The plastic material injection molding machine of claim 7, wherein said clutch is adapted to be actuated by means of a rod being axially displaceable relative to said transfer plate in said direction of approachment, said rod protruding from a surface of said transfer plate opposite said first mold portion.

9. The plastic material injection molding machine of claim 8, wherein said rod has a front side being flush with said second reference means as viewed in said direction of approachment.

10. The plastic material injection molding machine of claim 8, wherein said rod is journaled within said arm to be displaced in a longitudinal direction, wherein, further, said clutch is configured by a section of said rod and by a seat surface in said transfer plate associated to said rod section, said clutch immobilizing said rod section on said seat surface in a plane transversal to said direction of approachment said rod is in a first operational axial position, and letting said rod section move freely when said rod is in a second operational axial position.

11. The plastic material injection molding machine of claim 10, wherein said rod section and said seat surface are configured as complementary cones.

12. The plastic material injection molding machine of claim 10, wherein said rod is held in said first operational axial position by a spring, said spring being compressed during transition from said first to said second operational axial position.

13. The plastic material injection molding machine of claim 1, wherein said transfer plate is fixed to said handling system in said direction of approachment.

14. The plastic material injection molding machine of claim 13, wherein said transfer plate is held by a flange of said handling system in said direction of approachment.

15. The plastic material injection molding machine of claim 1, wherein said first and said second reference means come to engage one another in a form-fitting relationship when being brought into said registering position.

16. The plastic material injection molding machine of claim 15, wherein said first and said second reference means are configured as a bore and as a pin, respectively.

17. A method of transferring an article between a predetermined mold portion of a plastic material injection molding machine and a handling system, wherein the plastic material injection molding machine comprises a mold having a first and a second mold portion and a first reference on said first mold portion, wherein the handling system is configured to be inserted between the first mold portion and the second mold portion when the mold is in an open position, and wherein the handling system comprises a clutch and a transfer plate having a second reference thereon and being held in said handling system via a loose support that is bridged by said clutch, the method comprising:
 inserting said handling system between said first and said second mold portions when said mold is in the open position;
 closing the clutch for bridging said loose support at least during said insertion of said handling system;
 approaching said handling system towards first mold portion;
 opening said clutch;
 bringing said first and said second references into a registering position; and
 transferring said article.

18. The method of claim 17, wherein bringing said first and said second references into a registering position, and transferring said article are executed in a manner overlapping in time.

19. The method of claim 17, wherein said clutch is adapted to be closed in a manner overlapping in time when bringing said first and said second reference means out of said registering position.

20. The method of claim 17, wherein said clutch is adapted to be closed automatically when said handling system approaches said predetermined mold portion.

* * * * *